(12) United States Patent
Myerson et al.

(10) Patent No.: US 6,264,903 B1
(45) Date of Patent: Jul. 24, 2001

(54) METHOD FOR RECYCLING INDUSTRIAL WASTE STREAMS CONTAINING ZINC COMPOUNDS

(76) Inventors: Allan S. Myerson, 7 Druid Ct., Suffern, NY (US) 10901; Peter Robinson, R4 Stn. Main 6330 Jones Baseline, Fergus, ON (CA), N1M 2W5

(*) Notice: Subject to any disclaimer, the term of this patent is extended or adjusted under 35 U.S.C. 154(b) by 0 days.

(21) Appl. No.: 09/338,129

(22) Filed: Jun. 22, 1999

(51) Int. Cl.[7] .............. C22B 19/00; C22B 13/00; C22B 15/00; C22B 17/00

(52) U.S. Cl. .............. 423/101; 423/109; 423/622; 75/725; 75/726

(58) Field of Search .............. 423/109, 101, 423/622; 75/724, 725, 726, 961

(56) References Cited

U.S. PATENT DOCUMENTS

| | | |
|---|---|---|
| 3,849,121 | 11/1974 | Burrows . |
| 4,071,357 | 1/1978 | Peters . |
| 5,208,004 * | 5/1993 | Myerson .............. 423/109 |
| 5,234,669 * | 8/1993 | Bartlett .............. 423/109 |
| 5,464,596 | 11/1995 | Myerson . |
| 5,759,503 | 6/1998 | Myerson . |

* cited by examiner

Primary Examiner—Steven Bos
(74) Attorney, Agent, or Firm—Technoprop Colton LLC

(57) ABSTRACT

An industrial waste stream recycling method for recovery of high purity zinc oxide products and other chemical and metal values from industrial waste streams containing zinc compounds by leaching the waste stream with a solution of 30% or greater by weight ammonium chloride, resulting in a first product solution and undissolved materials; adding zinc metal to the first product solution, whereby zinc-displaceable metal ions contained in the first product solution are displaced by the zinc metal and precipitate out of the first product solution as metals, leaving a second product solution; and diluting the second product solution with water, resulting in the precipitation of zinc oxide.

18 Claims, 4 Drawing Sheets

METHOD FOR RECYCLING INDUSTRIAL WASTE STREAMS CONTAINING ZINC COMPOUNDS

BACKGROUND OF THE INVENTION

1. Field of the Invention

This invention relates to a process for recovery of zinc products including essentially pure metal oxides and metals. The present invention more specifically relates to an improved method for the recovery of essentially pure zinc oxide from EAF dust.

2. Description of Related Art

Zinc oxide typically is a fine white or grayish powder which has a variety of uses including as a rubber accelerator, as a pigment, as a dietary supplement and in the semiconductor field. Zinc oxide is found in commercial by-products including waste material streams such as fly ash and flue dust. Methods for recovering zinc oxides are known in the art, including recovering zinc oxide from industrial waste materials. Such previous methods have included leaching with mineral acid, caustic soda, ammonium hydroxide, and ammonium carbonate solutions. However, these methods have low yields of zinc oxide and typically do not recover pure zinc oxide, the recovered zinc oxide being contaminated with other metal salts. Therefore, in order to obtain pure zinc oxide, subsequent reduction and washing processes were necessary.

U.S. Pat. No. 3,849,121 to Burrows discloses a method for the selective recovery of zinc oxide from industrial waste. The Burrows method comprises leaching a waste material with an ammonium chloride solution at elevated temperatures, separating iron from solution, treating the solution with zinc metal and cooling the solution to precipitate zinc oxide. The Burrows patent discloses a method to take EAF dust which is mainly a mixture of iron and zinc oxides and, in a series of steps, to separate out the iron oxides and waste metals. However, the material obtained in the last step is a mixture of a small amount of zinc oxide, hydrated zinc phases which can include hydrates of zinc oxide and zinc hydroxide, as well as other phases and a large amount of diamino zinc dichloride $Zn(NH_3)_2Cl_2$ or other similar compounds containing zinc and chlorine ions. Currently, the Burrows method is not economically viable because of Environmental Protection Agency guidelines established subsequent to the issuance of the Burrows patent. Additionally, the Burrows method is not a continuous method and, therefore, is not economical as a continuous process.

U.S. Pat. No. 4,071,357 to Peters discloses a method for recovering metal values which includes a steam distillation step and a calcining step to precipitate zinc carbonate and to convert the zinc carbonate to zinc oxide, respectively. Peters further discloses the use of a solution containing approximately equal amounts of ammonia and carbon dioxide to leach the flue dust at room temperature, resulting in the extraction of only about half of the zinc in the dust, almost 7% of the iron, less than 5% of the lead, and less than half of the cadmium.

Steam distillation is contrary to dilution. Steam distillation precipitates zinc carbonate, other carbonates and iron impurities. Steam distillation also disadvantageously results in an increase in temperature which drives off ammonia and carbon dioxide, resulting in the precipitation of iron impurities and then zinc carbonate and other dissolved metals. The purity of the zinc carbonate obtained depends on the rate of steam distillation and the efficiency of solids separation as a function of time. Calcining converts the zinc carbonate to zinc oxide, whereas washing and drying at temperatures between 100° C. and 200° C. converts the zinc compounds to zinc oxide.

U.S. Pat. No. 5,464,596 to Myerson, commonly assigned with the present application, discloses a method for the recovery of zinc oxide by treating a waste stream with a 23% ammonium chloride at 90° C., separating undissolved components from the solution, displacing undesired metal ions from the solution using zinc metal, cooling the solution to precipitated out zinc compounds, washing the precipitate to remove various soluble zinc compounds, leaving zinc oxide of greater than 99%. The '596 patent teaches that ammonium chloride solutions must be at least 90° C. to sufficiently dissolve the zinc compounds. Heating an aqueous solution to such a temperature requires the expenditure of large amounts of energy. It is further taught that while $NH_4Cl$ concentrations below 23% do not dissolve the maximum amount of zinc oxide from the waste material, concentrations greater than 23% result in an impure zinc oxide due to the tendency of the $NH_4Cl$ to precipitate out of solution with the zinc compounds at such high concentrations. Furthermore, the cooling of the product solution results in the precipitation of various zinc species, resulting in crystallization of some species. Because of this, using the cooling step disclosed in Myerson '596, one cannot use concentrations of ammonium chloride solutions above about 23%, limiting the usefulness of the process disclosed in Myerson '596. Further, contaminates of the zinc oxide must be removed by an additional washing step.

U.S. Pat. No. 5,759,503 to Myerson, et al., commonly assigned with the present application, discloses a method for the recovery of zinc oxide by dissolving zinc oxide in an intermediate, diluting the intermediate by a factor of 3 to 30 by adding 70–100° C. water, and filtering out the resultant zinc oxide crystals. The '503 patent, along with its family of patents, disclose using ammonium chloride solutions of 23% and teach that using higher concentration ammonium chloride solutions will produce undesired results. This was the understanding at the time of invention of the processes disclosed and claimed in the Myerson '503 patent and its family of patents. These undesired results include the precipitation of various zinc species, resulting in crystallization of some species. Because of this, using the cooling step disclosed in Myerson '596, one cannot use concentrations of ammonium chloride solutions above about 23%, limiting the usefulness of the process disclosed in Myerson '503 Although the processes disclosed and claimed in Myerson '503 patent are valuable and perform admirably, it has now been discovered that by altering the process steps, including the addition of a dilution step, ammonium chloride solutions of 30% or greater can be used to recycle industrial waste streams.

Therefore, there exists a need for an alternative method that will recover essentially pure zinc oxide from industrial waste materials that is economical, quick, and efficient and, optionally also will allow the recovery of elemental lead, cadmium, and copper from industrial waste materials, at the lower end of the temperature range and at higher leach solution concentrations than previously thought possible.

BRIEF SUMMARY OF THE INVENTION

The present invention satisfies these needs in a method which recovers essentially pure zinc oxide from waste material containing zinc or zinc oxide. Along with the essentially pure zinc oxide, zinc metal also can be recovered, as well as values of other metallic elements originally contained in the waste material, such as lead, silver, and cadmium. The solutions used in the process are recycled such that liquid wastes are kept to a minimum and, ideally, eliminated. The solids recovered from the process, namely, the zinc oxide, zinc metal, other chemical and metal values, and other residues all can be used in other processes. One such residue, an iron oxide cake, is of such a quality that it can be used directly as the feedstock for the typical steel production process.

Briefly, the present invention provides a method for recovery of high purity zinc oxide products from industrial waste streams such as electric arc furnace effluents (dusts, fumes, and vapors) containing zinc compounds comprising the steps of: (a) leaching the waste stream with a solution of 30% or greater by weight ammonium chlorideat at least about 70° C., resulting in a first product solution and undissolved materials; (b) adding zinc metal to the first product solution in a cementation step, whereby zinc-displaceable metal ions contained in the first product solution are displaced by the zinc metal and precipitate out of the first product solution as metals, leaving a second product solution; and (c) diluting the second product solution with water, resulting in the precipitation of zinc oxide and a third product solution. The dilution step circumvents the crystallization of various species, allowing the use of the higher concentration ammonium chloride solution of approximately 30% or greater by weight. The various undissolved precipitates produced during the process comprise both waste products and chemical and metal values that can be recovered and sold, used in subsequent processes, or added to the feed to various industrial processes such as the iron and steel making processes.

The third product solution is concentrated after removing the zinc oxide, resulting in a fourth product solution comprising greater than 30% ammonium chloride. The fourth product solution then is combined with the original ammonium chloride solution of Step (a) to leach the industrial waste stream in a continuous process.

If the industrial waste material stream contains significant amounts of iron, the waste stream preferably is heated in a reducing atmosphere prior to leaching, resulting in an iron-containing residue and a combustion product (dust, fumes, and/or vapors) waste stream comprising oxides of zinc. The dust, fumes and/or vapors then are subjected to the process disclosed in this specification.

In yet another embodiment of the present invention, using a waste stream such as typical electric arc furnace dust (which typically contains zinc, cadmium, copper, lead, and iron metals and compounds) the precipitated metals will comprise zinc, lead, cadmium and copper compounds. This alternate embodiment further comprises the additional steps of: (1) treating the precipitated metals with an aqueous solution of either $H_2SO_4$ or $NH_4SO_4$, whereby zinc, cadmium, and copper compounds go into solution and lead compounds do not, resulting in a fifth product solution comprising zinc, cadmium and copper compounds and a second undissolved precipitate comprising lead compounds; (2) adding zinc metal to the fifth product solution, whereby cadmium and copper compounds are displaced by the zinc metal and precipitate out of the fifth product solution as a third precipitate, leaving a sixth product solution; and (3) treating the sixth product solution with calcium chloride, resulting in the precipitation of $CaSO_4$ from the sixth product solution. Again, the undissolved precipitates produced during the process comprise both waste products and chemical and metal values that can be recovered and sold, used in subsequent processes, or added to the feed to various industrial processes such as the iron and steel making processes.

If it is desired to control sodium or potassium chloride concentrations during the process, additional steps of: (i) adjusting the pH of the second product solution to between about 5 and about 8 with $NH_4OH$ prior to step(c); (ii) cooling at least a portion of the second product solution to precipitate diamino zinc dichloride; (iii) evaporating the second product solution to precipitate NaCl and KCl; and (iv) combining the second product solution with the ammonium chloride solution to leach the waste stream.

Therefore, it is an object of the present invention to provide a method for recovering zinc oxide from waste materials, such as fly ash or flue dust, which contain other metals, such as iron oxide, lead oxide, cadmium, copper and other materials.

Yet another object of the present invention is to provide a method for recovering zinc oxide in which all leaching and washing solutions are recycled for further use, and no leaching or washing solutions are disposed of into the sewers or the environment.

Still another object of the present invention is to provide a method for recovering zinc oxide which also results in the precipitation in elemental form of any lead, cadmium and copper metals contained in the starting materials.

Another object of the present invention is to provide a method for recovering zinc metal, zinc oxide and/or iron oxide which is economical, quick and efficient.

These objects and other objects, features and advantages of the present invention will become apparent to one skilled in the art when the following Detailed Description of the Preferred Embodiments is read in conjunction with the attached figures.

DETAILED DESCRIPTION OF THE PREFERRED EMBODIMENTS

Figure 1:
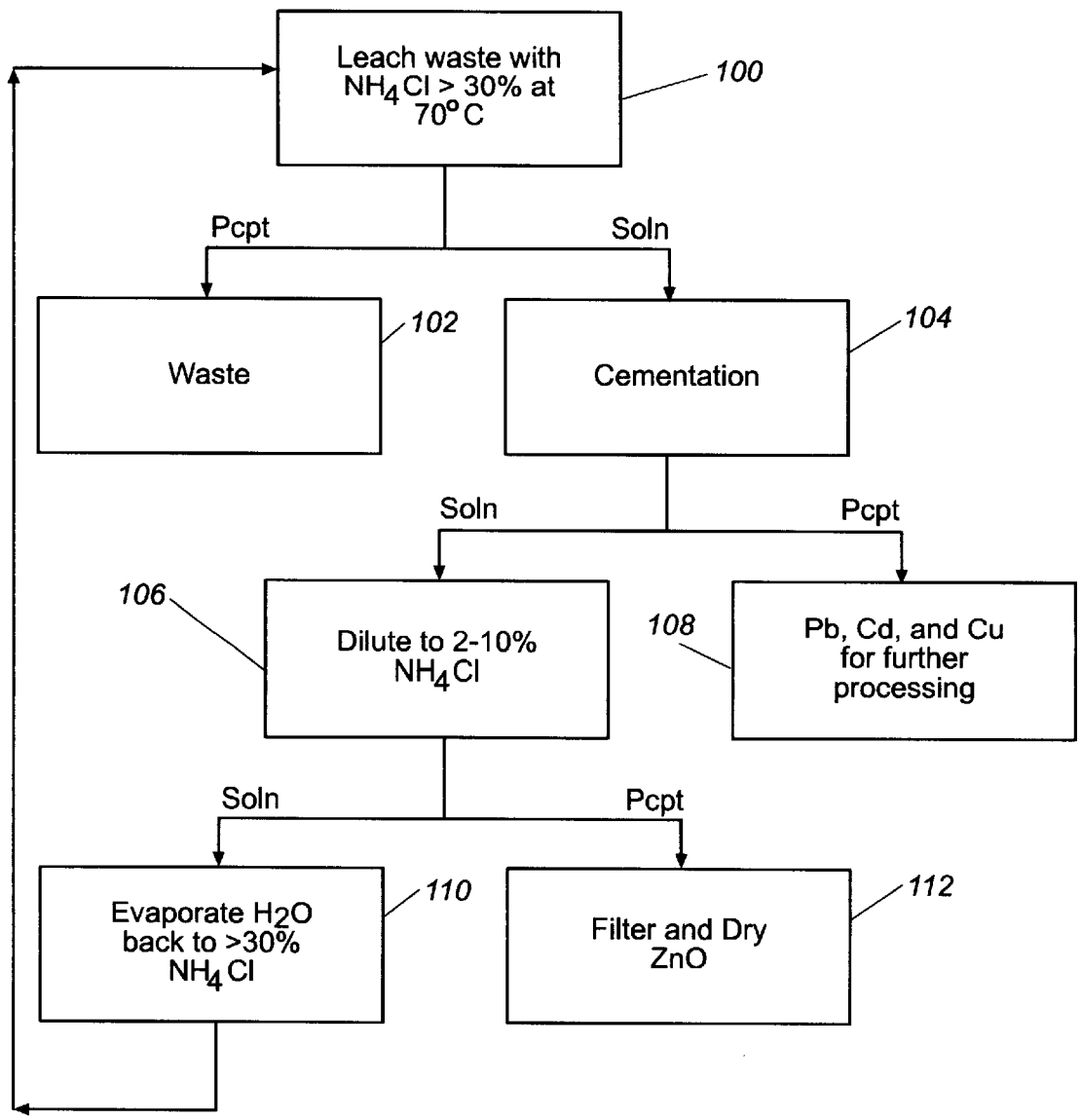
FIG. 1 is a flow chart of the purification steps executed in the preferred embodiment of the present invention.

Referring to FIG. 1, a preferred embodiment of the process is shown. The preferred waste materials such as fly ash or flue dust from electric arc furnaces, as well as other waste materials streams, including other metal producing and altering processes, contain economically valuable amounts of zinc compounds. However, these waste materials also contain oxides of iron, lead, calcium, potassium, cadmium, and copper. The preferred waste is dust, solids, vapors and/or fumes from a steel making process.

In step 100, a waste material is leached in an ammonium chloride solution resulting in a first product solution and undissolved materials. The ammonium chloride solution is greater than 30% ammonium chloride in water at a temperature above about 70° C. Prior art concentrations were typically not above 23% due to the tendency of ammonium chloride to precipitate out with zinc oxide. As explained in more detail below, the present process has overcome such limitations. The majority of the waste materials, including any zinc and/or zinc oxide, lead oxide, cadmium oxide, copper oxide, and other metal oxides, dissolves in the ammonium chloride solution forming a first product solution. Iron oxide, also typically present in the preferred waste materials, does not dissolve in the ammonium chloride solution, and remains as an undissolved material 102. Any other constituents in the waste materials not soluble in ammonium chloride also remain as undissolved materials 102. The product solution is filtered and the undissolved materials 102 are removed 102.

If iron oxide is present in the waste materials, the undissolved materials 102 separated from the first product solution typically is rich in iron oxide, and also typically has some impurities such as zinc ferrite. The undissolved materials 102 can be used as a feedstock for steel mills so long as the quantity of impurities is not too great. It is preferable to remove the impurities from the iron oxide prior to using the iron oxide as a feedstock. Reducing the iron oxide in the undissolved materials 102 to direct-reduced iron (DRI) also is desired as DRI can be used to replace part or all of the steel scrap charge. This is a first example of how even the waste from the present process is usable, resulting in an environmentally friendly process.

The iron oxide in the undissolved materials 102 can be reduced to DRI in two manners. First, carbon, in the form of activated carbon, carbon dust, carbon pellets or the like, can be introduced to the ammonium chloride and waste material mixture during the leaching process. The carbon reduces the iron oxide resulting in DRI upon heating. Second, the carbon can be introduced to the dried undissolved material cake using a ribbon blender. The carbon will react with the iron oxide, reducing the iron oxide to DRI upon heating. Adding heat to this process assists in the reduction.

The remaining first product solution contains zinc oxide and other dissolved metal oxides; namely, oxides of lead, cadmium, and copper. While this first product solution is still hot, finely powdered zinc metal is added to the first product solution in a cementation step 104. Through an electrochemical reaction, any lead, cadmium, and copper metal in solution plates out onto the surfaces of the zinc metal particles. The addition of sufficient powdered zinc metal results in the removal of most of the lead, cadmium, and copper of the first product solution by precipitation. After cementation, there is now a second product solution and a precipitate 108.

The second product solution is rich in zinc compounds, while the precipitate 108 is rich in oxides of lead, cadmium, and copper. The precipitate 108 is separated from the second product solution and, as will be described in more detail below, can optionally be treated further to recover the economically valuable metals. This is a second example of how the waste from the present process is usable, reducing the amount of waste form the process.

Purified zinc may be recovered as either zinc oxide by diluting the second product solution in a dilution step 106 or as elemental zinc by electrowinning (not shown). Recovery of zinc oxide by dilution is preferred, as it has been discovered that this allows the use of higher concentrations of ammonium chloride solutions of 30% or greater by weight. To recover zinc oxide in the dilution step 106, the second product solution is diluted to a concentration between about 2% and about 10% ammonium chloride. As the concentration of ammonium chloride in the second product solution drops, the solubility of zinc oxide decreases, thereby resulting in the precipitation of zinc oxide from the second product solution. When diluting the second product solution, it is preferable to add the second product solution to the water, rather than adding water to the second product solution. The resultant zinc oxide has significantly lower chloride content if the second product solution is added to the water. After dilution, there is now a third product solution and precipitated zinc oxide 112.

The preferred method of dilution involves adding the second product solution to the water, and not adding the water to the second product solution. Preferably, the water should be at 60° C. or higher during the entire dilution step. The second product solution should be added to the water in a gradual fashion. For example, in a batch system, one-third of the second product solution should be added to the total required amount of water and stirred to form a first intermediate solution. The remainder of the second product solution, either in one large batch or in two or more smaller batches, should then be added to the first intermediate solution to form the third product solution. This allows the ammonium concentration to be lowered to a relatively low level in the first intermediate solution, forcing the dilution to proceed along a defined path. The zinc oxide precipitates out of the first intermediate solution such that the concentration of ammonium chloride in the first intermediate solution is even lower when the remainder of the ammonium chloride solution is added to the first intermediate solution.

In another example, in a continuous system, a first fraction of the second product solution is added to water in a first vessel to form the first intermediate solution. The first intermediate solution should have a concentration of ZnO/$NH_4Cl$ to water of between about 2% and 6%, preferably about 3.3%. Any zinc oxide precipitating out of the first intermediate solution is removed from the first vessel. The first vessel is maintained at steady state at the desired concentration by removing any zinc oxide precipitate, adding additional water or second product solution, and/or removing first intermediate solution. The removed first intermediate solution is transferred to a second vessel where a second fraction of the second product solution is added to the first intermediate solution to form a second intermediate solution. The second intermediate solution should have a concentration of ZnO/$NH_4Cl$ to water of between about 5% and 9%, preferably 6.6%. The second vessel is maintained at steady state at the desired concentration by removing any zinc oxide precipitate, adding additional second product solution, and/or removing second intermediate solution. The removed second intermediate solution is transferred to a third vessel where a third fraction of the second product solution is added to the second intermediate solution to form a third intermediate or final solution. The third intermediate or final solution should have a concentration of ZnO/$NH_4Cl$ to water of between about 8% and 12%, preferably 10%. This also allows the ammonium concentration to be lowered to a relatively low level in the first intermediate solution, forcing the dilution to proceed along a defined path. The zinc oxide precipitates out of the first intermediate solution such that the concentration of ammonium chloride in the first intermediate solution is even lower when the remainder of the ammonium chloride solution is added to the first intermediate solution.

The use of thirds as the fractions of second solution added to each vessel is preferred, but it should be understood that any fraction of the second product solution can be added to the total required amount of water at a time. The important criteria is that the amount of the second product solution added to the total required amount of water be kept to a level allowing for the greatest amount of zinc oxide to precipitate out of the first intermediate solution. This also prevents the formation of tetra-amino-zinc-tetrachloride [$Zn(NH_4)_4Cl_4$], a low zinc content, fine needle crystal that is difficult to filter separate or wash. The amount of water necessary, and the addition rates of second product solution to the water, can be determined by one of ordinary skill in the basic chemical arts without undue experimentation. Further, determining the total required amount of water is simple chemistry and well within the skill of the person of ordinary skill in the art of this invention. It simply is enough water to lower the concentration of ammonium chloride in the second product solution, which can be determined by simple chemical analysis, to a theoretical concentration of from about 2% to about 10% ammonium chloride.

The third product solution is filtered to remove the precipitated zinc oxide 112, which is placed in a drying oven at a temperature of over 100° C. After a sufficient drying period, the resultant dry white powder is essentially pure zinc oxide.

If it is desired to recover elemental zinc, the second product solution is subjected to electrolysis in an electrolytic cell containing an anode and a cathode. The second product solution comprises zinc ions in solution as $Zn^{2+}$, which will be electrodeposited on the cathode. Although it is preferable to have the cathode made from zinc metal, cathodes of other materials will allow the electrodeposition of zinc metal from the second product solution.

Any of the electrolysis cells discussed in the literature are suitable, as long as such cells are configured for the electrolysis of zinc ion containing solutions. The two electrodes of the electrolysis cells are connected externally to a power supply capable of impressing a suitable voltage across the electrodes. The zinc ions, being positive in nature, migrate toward the negative electrode, or cathode, where they combine with electrons supplied by the external circuit to form neutral zinc metal atoms. When this happens, the zinc metal, in effect, electroplates onto the cathode. By using a zinc cathode, the entire cathode can be removed and used as necessary as a source of zinc. Alternatively, a cathode on which electroplated zinc metal can be easily removed can be used.

If zinc oxide is precipitated from the second product solution by dilution, the diluted third product solution contains ammonium chloride and other compounds. Rather than dispose of this solution, it is preferable to produce a more concentrated (>30%) ammonium chloride solution 110 that is recycled back to the leaching step 100. This can be accomplished using evaporators or reverse osmosis membrane technology. This is a third example of how the waste from the present process is usable, reducing the amount of waste produced by the present process to a minimum.

From an economically competitive situation, the use of reverse osmosis membrane technology to concentrate the third product solution to obtain a concentrated ammonium chloride solution on one side of the membrane will save feed costs. Every so often, it will be necessary to back flush the salts off the membrane to recover them for makeup use in the future. In essence, reverse osmosis membrane technology is using a pump to pump a solution through a membrane, which is significantly lower in cost than burning natural gas in an evaporator condenser to evaporate water from a solution. This technology is used to filter out sodium chloride and the minerals out of seawater to make distilled water.

Figure 2:
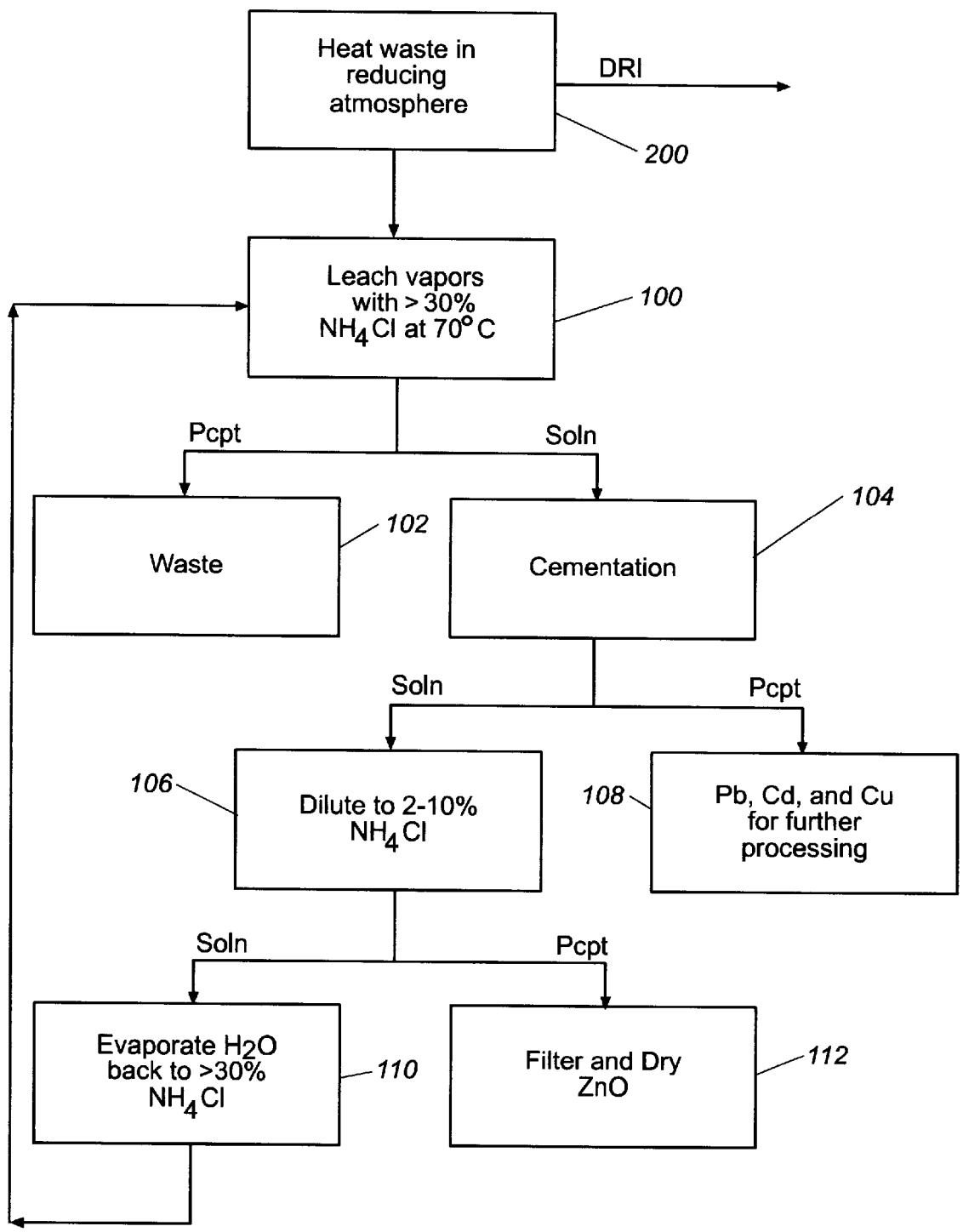
FIG. 2 is a flow chart of the purification steps executed with the optional reduction step, in accordance with an alternative embodiment of the present invention.

Referring to now FIG. 2, if there is significant iron content in the waste material, it is preferable to first heat the waste material in a reducing atmosphere in a reduction step 200, prior to the leaching step 100. The waste material is typically reduced at a temperature greater than 420° C., and preferably between 700° C. and 1300° C. The reducing atmosphere can be created by using hydrogen gas, simple carbon species gases, such a carbon dioxide, or by heating the material in an oxygen containing gas in the presence of elemental carbon. The carbon, which may be in the form of powdered coke or coal, is mixed with the iron and zinc containing waste prior to the reduction step. Examples of reduction processes include rotary hearth and rotary kiln furnaces. In these processes, the powdered mixture is formed into briquettes or pellets before feeding to the furnace. The iron oxide is reduced to metallic iron and remains within the briquette or pellet. Zinc, lead and cadmium are reduced and leave the briquette or pellet in vapor form which is subsequently oxidized on contact with oxygen. Alternatively, a mixture containing electric arc furnace dust may be added back to the electric arc furnace which operates under reducing conditions. Mixtures of waste materials such as electric arc furnace dust, oily mill scale and other flue dusts can be used to improve the value of the iron product. The carbon is preferably in the form of dust or pellets. Typically heating times are from 4 minutes to 4 hours, depending on the method used.

The heating and reduction step 200 results in the reduction of the iron compounds in the waste material into direct reduced iron (DRI), and the generation of volatile materials and combustion products. The DRI can be fed directly into a steel mill as a feed source. The combustion products, in the form of exhaust dusts, vapors, and fumes, are recovered by a filter process, such as a bag house or a wet scrubber. The zinc, lead, cadmium, and copper in the waster material are vaporized in the heating and reduction step 200 and comprise a majority of the exhaust dusts, vapors, and fumes. The heating and reduction step 200 is not necessary if there is no significant iron content in the waste. The heating and reduction step 200 is a fourth example of how waste from the present process (in this case iron oxides) is usable, further reducing the amount of waste produced by the present process.

Once the waste material is reduced, the process as represented in FIG. 2 continues just as the preferred embodiment represented in FIG. 1. The combustion product (the exhaust dusts, vapors, and fumes) are leached in leaching step 100, undissolved materials 102 are separated from the leachant, and the leachant (first product solution) is subjected to cementation step 104 to remove Pb, Cd, and Cu, for further processing 108. The remaining solution (second product solution) is diluted with water in a dilution step 106 to 2–10% $NH_4Cl$, thus prompting ZnO to precipitate out of the solution. The now remaining solution (third product solution) is then concentrated back to >30% $NH_4Cl$ in a concentration step 110 and is recycled back into the process as a leaching solution.

Figure 3:
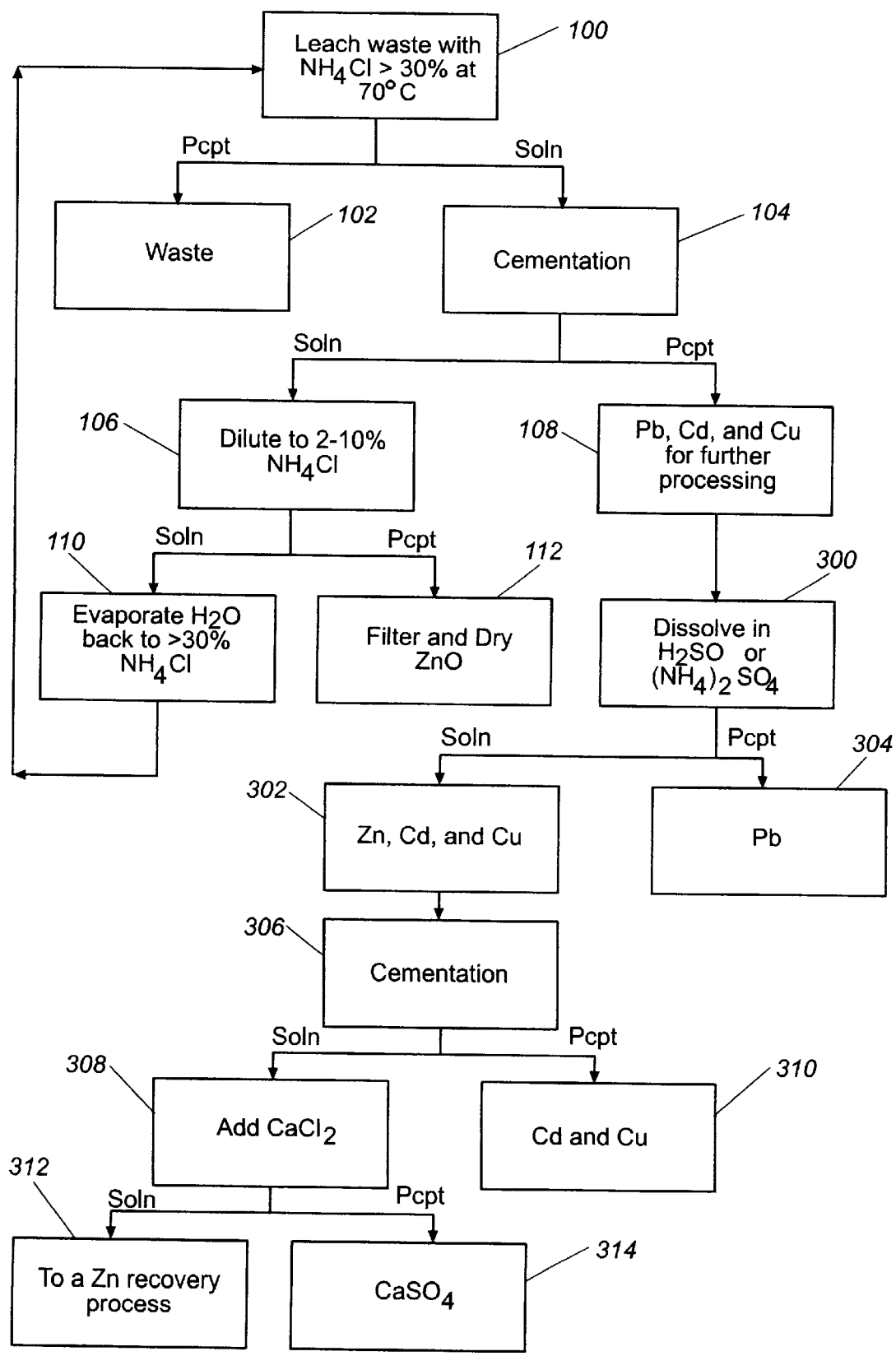
FIG. 3 is a flow chart of the purification steps executed to further isolate precipitated metals, in accordance with an alternative embodiment of the presented invention.

Waste materials typically have varying amounts of lead, cadmium, and copper metals contained therein. For various reasons, it is desirable to remove such metals from the waste materials, for example, to recycle the lead, cadmium, and copper, or to prevent their release into the environment. Referring to FIG. 3, the lead, cadmium, and copper compounds removed from the first product solution during the cementation step 104 as precipitates 108 can be recovered by first treating the compounds with $H_2SO_4$ or $(NH_4)_2SO_4$ in a dissolution step 300. The zinc, cadmium, and copper compounds will go into solution while the lead compounds will not. The lead compounds are filtered out 304, leaving a solution of zinc, cadmium and copper compounds 302.

The Zn, Cd, and Cu-containing solution 302 is then treated with zinc powder in a second cementation step 306 to result in the electrodeposition of Zn and Cd on the zinc, which is then filtered out 310, leaving a solution of zinc compounds 308. To this solution, calcium chloride is added. The calcium react with the sulfate present in the solution from the $H_2SO_4$ or $(NH_4)_2SO_4$ to form $CaSO_4$, when precipitates out. The $CaSO_4$ is filtered out 314 and the remaining solution can be recycled back to the leaching step to further recover zinc 312.

Figure 4:
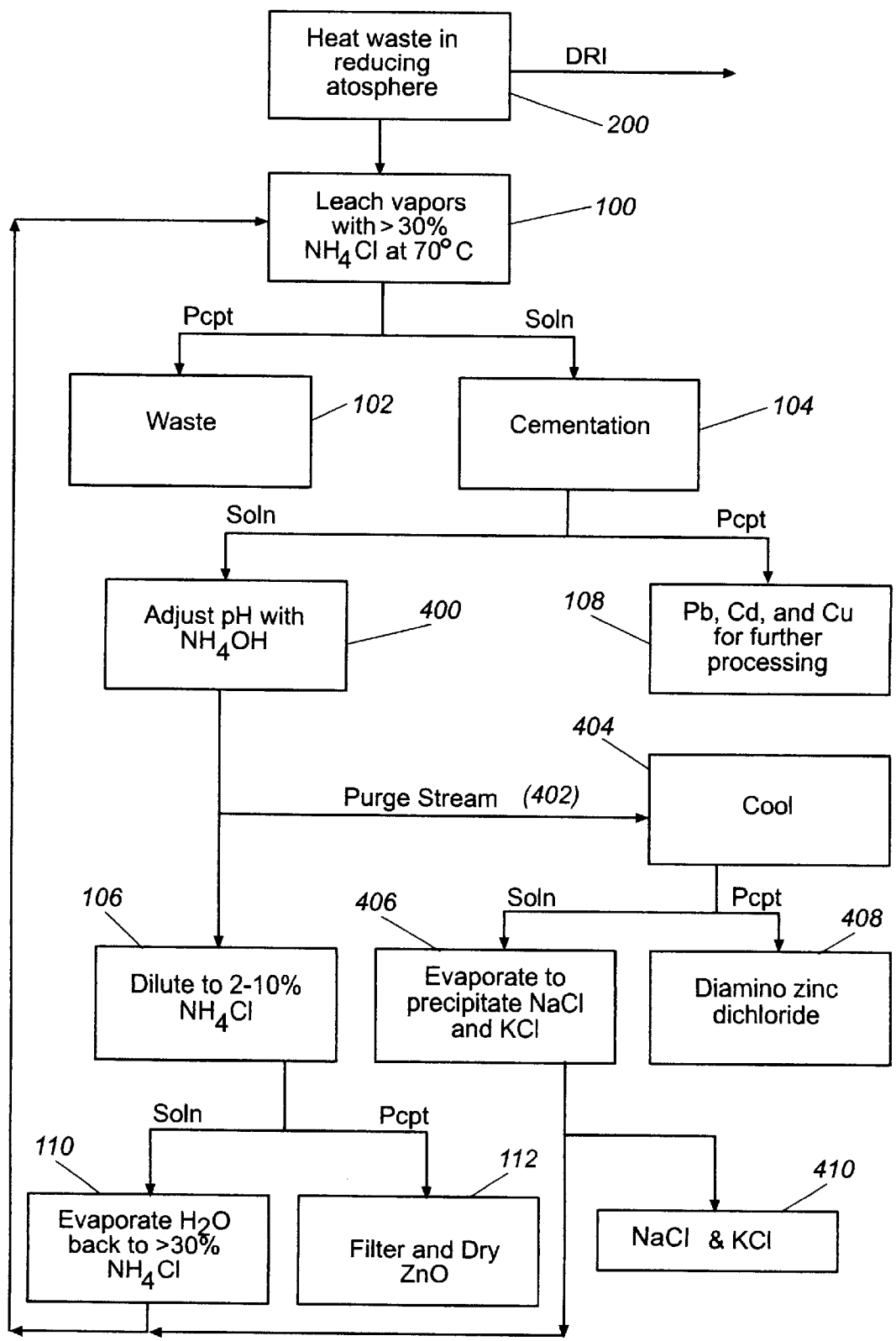
FIG. 4 is a flow chart of the purification steps executed to control sodium or potassium chloride levels, in accordance with an alternative embodiment of the present invention.

Referring to FIG. 4, sodium and potassium chlorides, introduced by the initial waste materials stream, may accumulate in the various product solutions, thus adversely affecting process performance. The chloride level may optionally be controlled by periodic removal of chloride salts. This is preferably accomplished by adjusting the pH of the second product solution in a pH adjustment step 400 prior to the dilution step 106. This will neutralize the acidic effects of the chloride ions by forming reacting therewith to form ammonium chloride and water.

At least a portion of the pH-adjusted second product solution may be removed through a purge stream prior to the dilution step 106 and allowed to cool in a cooling step 404. As the purged pH-adjusted second product solution cools, a portion of the zinc compounds will precipitate out of the purged pH-adjusted solution as diamino zinc dichloride, which is then filtered out in a filtration step 408. The use of a purge stream assists in the control of the concentration of sodium chloride and/or potassium chloride in the second product solution. It is preferred to keep the concentrations of sodium chloride and potassium chloride down and if these concentrations build up, a larger purge stream is used.

The remaining product solution (third product solution) is evaporated or otherwise concentrated in concentration step 110 to precipitate sodium chloride and potassium chloride, which are filtered out in a second filtration step 410. The remaining concentrated solution can then be reintroduced into the process at the leaching step 100. In this way, chloride levels are maintained as to not adversely effect the formation of substantially pure zinc oxide.

The above description sets forth the best mode of the invention as known to the inventor at this time, and is for illustrative purposes only, as it is obvious to one skilled in the art to make modifications to this process without departing from the spirit and scope of the invention and its equivalents as set forth in the appended claims.

What is claimed is:

1. A method for recycling industrial waste streams containing zinc compounds comprising the steps of:
    (a) leaching said waste stream with a solution of 30% or greater by weight ammonium chloride maintained at a temperature above 70° C., resulting in a first product solution and undissolved materials;
    (b) adding zinc metal to said first product solution, whereby zinc-displaceable metal ions contained in said first product solution are displaced by said zinc metal and precipitate out of said first product solution as metals, leaving a second product solution;
    (c) adjusting the pH of said second product solution to between about 5 and about 8 with $NH_4OH$; and
    (d) diluting said second product solution with water to between 2% and 10% ammonium chloride, resulting in the precipitation of zinc oxide and a third product solution.

2. A method as claimed in claim 1, wherein said solution of ammonium chloride is maintained at a temperature above about 70° C.

3. A method as claimed in claim 2, wherein said second product solution is diluted to between about 2% and about 10% ammonium chloride in step(c).

4. A method as claimed in claim 3, wherein said third product solution is concentrated after removing said zinc oxide, resulting in a fourth product solution comprising greater than 30% ammonium chloride.

5. A method as claimed in claim 4, wherein said fourth product solution is combined with the ammonium chloride solution of step (a) to leach said waste stream.

6. A method as claimed in claim 1, wherein said waste stream is heated in a reducing atmosphere prior to leaching, resulting in an iron-containing residue and a waste stream comprising oxides of zinc.

7. A method as claimed in claim 1, wherein said waste stream further comprises lead, cadmium, and copper compounds.

8. A method as claimed in claim 7, wherein said precipitated metals comprises zinc, lead, cadmium and copper.

9. A method as claimed in claim 8, further comprising the step of treating said precipitated metals with an aqueous solution of a compound selected from the group consisting of $H_2SO_4$ and $(NH_4)_2SO_4$, whereby zinc, cadmium, and copper compounds go into solution and lead compounds do not, resulting in a fifth product solution comprising zinc, cadmium and copper compounds and a second undissolved precipitate comprising lead compounds.

10. A method as claimed in claim 9, further comprising the step of adding zinc metal to said fifth product solution, whereby cadmium and copper compounds are displaced by said zinc metal and precipitate out of said fifth product solution as a third precipitate, leaving a sixth product solution.

11. A method as claimed in claim 10, further comprising the step of treating said sixth product solution with calcium chloride, resulting in the precipitation of $CaSO_4$ from said sixth product solution.

12. A method as claimed in claim 11, wherein said sixth product solution is combined with said solution of ammonium chloride to leach said waste stream in step (a).

13. A method as claimed in claim 12, wherein said aqueous solution is $H_2SO_4$.

14. A method as claimed in claim 12, wherein said aqueous solution is $(NH_4)_2SO_4$.

15. A method as claimed in claim 1, further comprising the steps of:
    (i) cooling at least a portion of said second product solution to precipitate diamino zinc dichloride;
    (ii) removing said diamino zinc dichloride from said second product solution;
    (iii) evaporating said second product solution to precipitate NaCl and KCl;
    (iv) removing said NaCl and KCl from said second product solution; and
    (v) combining said second product solution with said ammonium chloride solution to leach said waste stream.

16. A method as claimed in claim 2, wherein said solution of ammonium chloride is maintained at a temperature of between about 70° C. and 100° C.

17. A method as claimed in claim 1, further comprising the step of treating said precipitated metals with an aqueous solution of a compound selected from the group consisting of $H_2SO_4$ and $(NH_4)_2SO_4$, whereby zinc, cadmium, and copper compounds go into solution and lead compounds do not, resulting in a recycle product solution comprising zinc, cadmium and copper compounds and a second undissolved precipitate comprising lead compounds.

18. A method as claimed in claim 17, wherein said industrial waste stream is heated in a reducing atmosphere prior to leaching, resulting in an iron-containing residue and a waste stream comprising oxides of zinc.

* * * * *